(12) United States Patent
Ma et al.

(10) Patent No.: US 7,871,520 B2
(45) Date of Patent: Jan. 18, 2011

(54) HIGH-TEMPERATURE MEMBRANE DISTILLATION

(75) Inventors: Zidu Ma, Ellington, CT (US); James R. Irish, Vernon, CT (US); Xiaohong Liao, South Windsor, CT (US); Haralambos Cordatos, Colchester, CT (US); Xiaomei Yu, Glastonbury, CT (US)

(73) Assignee: Milton Roy Company, Ivyland, PA (US)

( * ) Notice: Subject to any disclaimer, the term of this patent is extended or adjusted under 35 U.S.C. 154(b) by 0 days.

(21) Appl. No.: 12/002,690

(22) Filed: Dec. 18, 2007

(65) Prior Publication Data

US 2009/0152199 A1     Jun. 18, 2009

(51) Int. Cl.
*B01D 15/00*     (2006.01)
*B01D 3/10*      (2006.01)

(52) U.S. Cl. .................... 210/640; 203/10; 210/180
(58) Field of Classification Search ........... 210/640, 210/321.6, 321.8, 321.81, 321.9, 175, 180; 202/177, 200; 203/100, 10; 95/45–54

See application file for complete search history.

(56) References Cited

U.S. PATENT DOCUMENTS

| 3,228,876 A | | 1/1966 | Mahon | |
|---|---|---|---|---|
| 4,444,662 A | | 4/1984 | Conover | |
| 4,746,437 A | | 5/1988 | Koseki et al. | |
| 4,752,305 A | | 6/1988 | Johnson | |
| 4,781,834 A | | 11/1988 | Sekino et al. | |
| 4,929,259 A | * | 5/1990 | Caskey et al. | 210/321.89 |
| 5,102,550 A | * | 4/1992 | Pizzino et al. | 210/640 |
| 5,110,475 A | * | 5/1992 | Rossling et al. | 210/640 |
| 5,158,581 A | | 10/1992 | Coplan | |
| 5,176,725 A | | 1/1993 | Puri et al. | |

(Continued)

FOREIGN PATENT DOCUMENTS

EP     0442445 B1     9/1995

(Continued)

OTHER PUBLICATIONS

Islam, AM., Membrane Distillation Process for Pure Water and Removal of Arsenic, Master of Science thesis for International Master's Program in Applied Environmental Measurement Techniques, Chalmers University of Technology (Gothenburg, Sweden). (publicly available prior to Jul. 12, 2007).

(Continued)

*Primary Examiner*—Ana M Fortuna
(74) *Attorney, Agent, or Firm*—Kinney & Lange, P.A.

(57) ABSTRACT

A membrane module comprising an outer casing having an interior region, a plurality of hollow fiber membranes extending through at least a portion of the interior region, and having exterior surfaces and inner hollow regions, where the inner hollow regions are configured to provide flow paths for a distillate fluid. The membrane module further comprises an opening extending through the outer casing for providing a feed solution to the interior region adjacent the exterior surfaces of the plurality of hollow fiber membranes, where the feed solution provided to the opening has an elevated temperature that is greater than an atmospheric-pressure boiling temperature of the feed solution, and an elevated pressure at which an effective boiling temperature of the feed solution is greater than the elevated temperature.

5 Claims, 4 Drawing Sheets

U.S. PATENT DOCUMENTS

| | | | |
|---|---|---|---|
| 5,282,964 A | | 2/1994 | Young et al. |
| 5,300,197 A | * | 4/1994 | Mitani et al. ............... 202/177 |
| 5,352,236 A | * | 10/1994 | Jung et al. ................. 606/194 |
| 5,352,361 A | | 10/1994 | Prasad et al. |
| 6,103,118 A | | 8/2000 | Ter Meulen |
| 6,156,096 A | | 12/2000 | Sirkar |
| 6,183,639 B1 | | 2/2001 | de Winter |
| 6,210,464 B1 | * | 4/2001 | Nakanishi et al. ............. 95/52 |
| 6,383,341 B1 | | 5/2002 | Lysen |
| 6,569,341 B2 | * | 5/2003 | Bowser ..................... 210/640 |
| 6,645,381 B2 | | 11/2003 | McEvoy |
| 6,716,355 B1 | | 4/2004 | Hanemaaijer et al. |
| 6,918,886 B1 | | 7/2005 | Baurmeister |
| 7,223,339 B2 | * | 5/2007 | Nakamatsu et al. .... 210/321.81 |
| 7,273,549 B2 | * | 9/2007 | Williams et al. ............ 210/209 |
| 7,381,858 B2 | * | 6/2008 | Huff et al. .................. 585/805 |
| 7,452,405 B2 | * | 11/2008 | Duraiswamy et al. .......... 95/45 |
| 7,459,084 B2 | * | 12/2008 | Baig et al. ................. 210/640 |
| 7,608,185 B2 | * | 10/2009 | Liao et al. ................ 210/321.8 |
| 2004/0211726 A1 | * | 10/2004 | Baig et al. ................. 210/640 |
| 2005/0184006 A1 | | 8/2005 | Ma et al. |
| 2006/0076294 A1 | | 4/2006 | Sirkar et al. |
| 2007/0107884 A1 | | 5/2007 | Sirkar et al. |

FOREIGN PATENT DOCUMENTS

| | | |
|---|---|---|
| EP | 0684870 B1 | 5/1997 |
| WO | 7900069 A1 | 2/1979 |
| WO | 9915463 A1 | 4/1999 |
| WO | WO03/000389 A2 | 1/2003 |

OTHER PUBLICATIONS

Liu, C., et al., Applying Membrane Distillation in High-Purity Water Production for Semiconductor Industry, Department of Energy Technology, Royal Institute of Technology (Stockholm, Sweden). (publicly available prior to Jul. 12, 2007).

El-Bourawi, M.S., et al., A Framework for Better Understanding Membrane Distillation Separation Process, Journal of Membrane Science, 285(2006) 4-29, Aug. 8, 2006.

Sivakumar, S.; et al., Optimizing Membrane Distillation Using Hollow Fibres, Sustainable Earth Research Centre, Environmental Engineering, University of Wollongong (Wollongong, Australia). (publicly available prior to Jul. 12, 2007).

Drioli, E; et al., Microporous Membranes in Membrane Distillation, Pure & Appl. Chem., vol. 58, No. 12, pp. 1657-1662, 1986 IUPAC.

Meindersma, GW, et al., Desalination and Water Recycling by Air Gap Membrane Distillation, Desalination 187 (2006) 291-301.

Koschikowski, J., et al., Solar Thermal-Driven Desalination Plants Based on Membrane Distillation, Desalination 156 (2003) 295-304.

Guijt, CM, et al., Air Gap Membrane Distillation 1. Modeling and Mass Transport Properties for Hollow Fibre Membranes, Separation and Purification Technology 43 (2005) 233-244.

Guijt, CM, et al., Air Gap Membrane Distillation 2. Model Validation and Hollow Fibre Module Performance Analysis, Separation and Purification Technology 43 (2005) 245-255.

Lawson K., et al., Membrane Distillation, Journal of Membrane Science, 124 (1997) 1-25, Aug. 5, 1996.

Chernyshov, M., et al., Modeling Temperature and Salt Concentration Distribution in Membrane Distillation Feed Channel, Desalination 157 (2003) 315-324.

Official Search Report of the European Patent Office in counterpart foreign Application No. 08254048.5 filed Dec. 9, 2008.

Schneider, Holz, Wollbeck, and Ripperger. "Membrane and Modules for Transmembrane Distillation." Journal of Membrane Science. 39th Ed. (1988) pp. 25-42.

R. W. Baker. "Membrane Technology and Applications" (2004) pp. 506-508.

* cited by examiner

HIGH-TEMPERATURE MEMBRANE DISTILLATION

BACKGROUND

The present invention relates to distillation systems for liquid treatment processes. In particular, the present invention relates to distillation systems containing hollow fiber membrane modules for separating distillate fluids from feed solutions in liquid treatment processes.

In recent years, membrane distillation has become increasingly popular in a variety of fluid-treatment applications. The membranes are typically hydrophobic and microporous to keep the feed solution separated from that of the distillate during operation. Hollow fiber membranes are typically employed in tube/shell configurations, where bundles of hollow fiber membranes are arranged along the longitudinal axes of the modules. For membrane distillation, each hollow fiber membrane in the bundle is typically a hydrophobic, microporous membrane having an exterior surface and an inner hollow tubular region. The exterior surfaces of the hollow fiber membranes face a shell side of the module, which is the portion of the module containing the feed solution. The inner hollow tubular regions define a tube side of the module, which provides a conduit for collecting the distillate fluids separated from the feed solution.

During membrane distillation, the feed solution is typically preheated to form a temperature differential across the hollow fiber membranes. This temperature differential creates a vapor pressure differential between the shell side and the tube side of the fibers in the module, which causes a portion of the feed solution to evaporate and the vapor transmits through the hollow fiber membranes. The transmitted vapor then condenses at the internal surface/liquid interface of the membranes on the distillate side, thereby providing the desired distillate fluid. Because the desired distillate fluid is obtained from the membrane separation process, the production rate of the desired distillate fluid is dependent on the separation rate across the hollow fiber membranes. Thus, there is an ongoing need for systems and techniques for increasing the separation rates across hollow fiber membranes.

SUMMARY

The present invention relates to a hollow fiber membrane module and a distillation system incorporating the hollow fiber membrane module. The hollow fiber membrane module includes an outer casing having an interior region, and a plurality of hollow fiber membranes extending through at least a portion of the interior region. The plurality of hollow fiber membranes have exterior surfaces and inner hollow regions, where the inner hollow regions are configured to provide flow paths for a distillate fluid. The hollow fiber membrane module further includes an opening extending through the outer casing for providing a feed solution to the interior region adjacent the exterior surfaces of the plurality of hollow fiber membranes. The feed solution provided to the opening has an elevated temperature that is greater than an atmospheric-pressure boiling temperature of the feed solution, and an elevated pressure at which an effective boiling temperature of the feed solution is greater than the elevated temperature, and which is less than a liquid penetration pressure of the plurality of hollow fiber membranes. The present invention further relates to a method of separating the distillate fluid from the feed solution.

DETAILED DESCRIPTION

Figure 1:
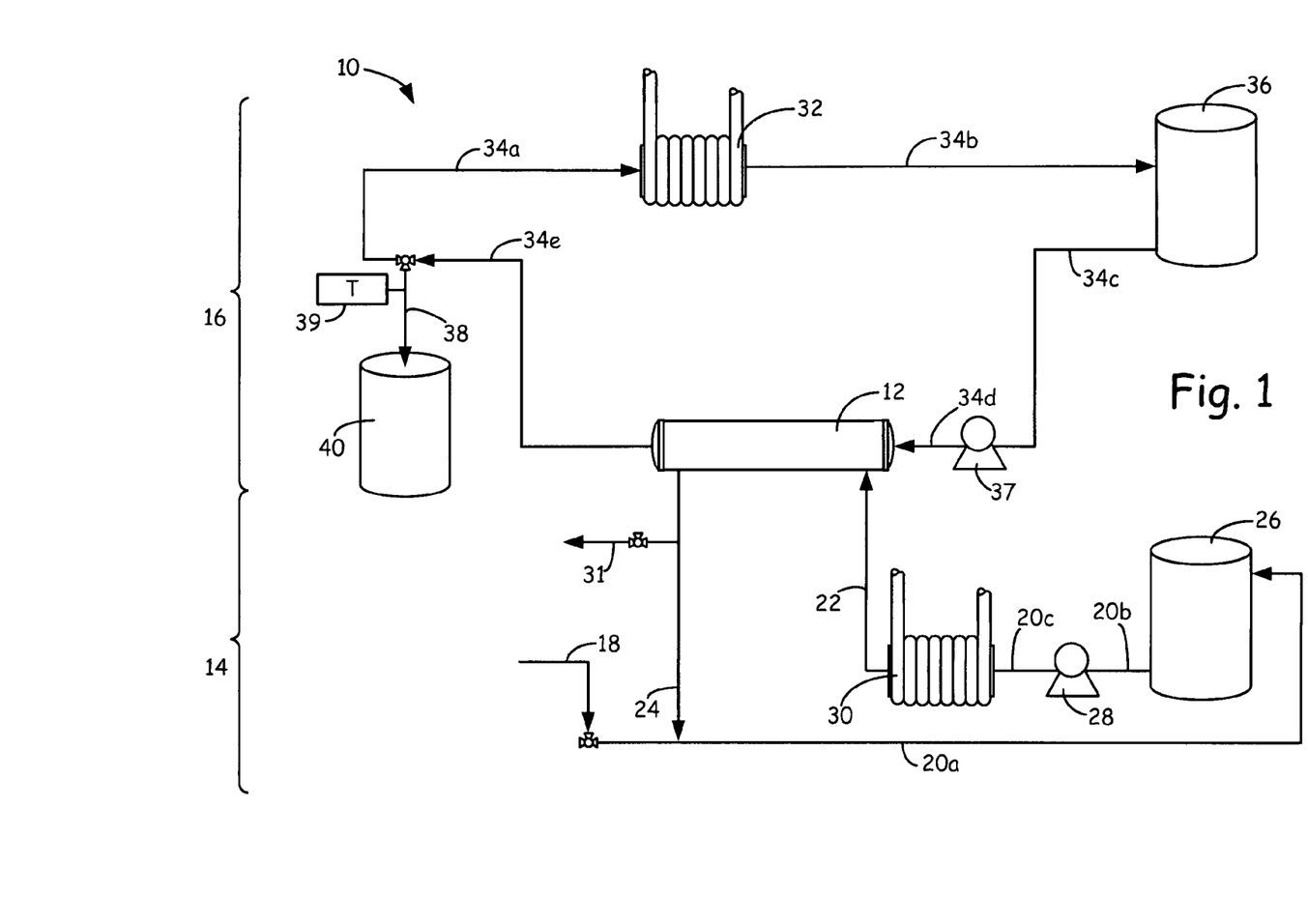
FIG. 1 is a schematic illustration of a distillation system that includes a hollow fiber membrane module.

FIG. 1 is a schematic illustration of distillation system 10, which includes membrane module 12, feed loop 14, and distillate loop 16, and is a suitable system for separating a desired distillate fluid from a feed solution. As discussed below, feed loop 14 provides the feed solution to membrane module 12 at an elevated temperature that is greater than an atmospheric-pressure boiling temperature of the feed solution. The elevated temperature increases the separation rate of the distillate fluid from the feed solution, which correspondingly increases the production rate of the distillate fluid during operation. As further discussed below, the feed solution is also provided to membrane module 12 at an elevated pressure at which the effective boiling temperature of the feed solution is greater than the elevated temperature of the feed solution. This prevents contaminants of the feed solution from vaporizing and mixing with the desired distillate fluid.

Examples of suitable feed solutions for use with distillation system 10 include solutions containing compounds that are separable by vapor pressure differentials across hydrophobic, microporous membranes, such as aqueous brine solutions for water treatment processes. As used herein, the term "solution" refers to a carrier liquid that contains one or more solids that are fully dissolved, partially dissolved, dispersed, emulsified, or otherwise suspended in the carrier liquid(s). For example, the feed solution may be an aqueous brine solution containing salt that is at least partially dissolved in a water carrier, such as brackish water or sea water. In this example, distillation system 10 may be used to separate at least a portion of the water from the aqueous brine solution to provide the clean water as the distillate fluid. Distillation system 10 also desirably includes standard fluid processing equipment (not shown), such as process control units, fluid pumps, filters, and discharge lines.

Membrane module 12 is a hollow fiber membrane module that separates the distillate fluid from the feed solution (e.g., water from an aqueous brine solution) via vapor pressure differentials. As discussed below, membrane module 12 is divided into a shell side (not shown in FIG. 1) and a tube side (not shown in FIG. 1), where the shell side is in fluid communication with feed loop 14, and the tube side is in fluid communication with distillate loop 16. During operation, the heated and pressurized feed solution flows from feed loop 14 to the shell side of membrane module 12. While the feed solution flows through the shell side of membrane module 12, the feed solution is separated into the desired distillate fluid and a residual concentrated feed solution. The desired distillate fluid transfers to the tube sides of membrane modules 12, and enters distillate loop 16. The residual concentrated feed solution remains on the shell side of membrane module 12 and reenters feed loop 14.

While distillation system 10 is shown with a single membrane module (i.e., membrane module 12), distillation system 10 may alternatively include additional numbers of membrane modules 12. Examples of suitable numbers of membrane modules 12 for use in distillation system 10 range from one to one hundred; particularly suitable numbers of membrane modules 12 for use in distillation system 10 range from one to twenty five; and even more particularly suitable numbers of membrane modules 12 for use in distillation system 10 range from one to ten. The membrane modules 12 can be arranged in serial configurations, parallel configurations, and combinations thereof.

Feed loop 14 is a fluid pathway for the feed solution, and includes feed source line 18, feed conveyance lines 20a-20c, feed inlet line 22, feed outline line 24, feed reservoir tank 26, fluid pump 28, heat exchanger 30, and discharge line 31. Feed source line 18 is a valve-controlled fluid conduit for transferring the feed solution from a feed solution source (not shown) to feed loop 14. When distillation system 10 reaches a steady state operation, portions of the feed solution are separated within membrane module 12 to provide the desired distillate fluid in distillate loop 16. As such, feed source line 18 desirably provides the feed solution to balance the steady state flow in feed loop 14. The feed solution provided by feed source line 18 is desirably pressurized to substantially maintain the elevated pressure of the feed solution in feed loop 14.

Feed conveyance lines 20a-20c are fluid conduits for feed loop 14, and provide a counter-clockwise flow path in the embodiment shown in FIG. 1. Feed inlet line 22 is a fluid conduit that interconnects feed loop 14 and membrane module 12, thereby allowing the feed solution to flow into the shell side of membrane module 12. Feed outlet line 24 is a fluid conduit that interconnects feed loop line 20a to membrane module 12. This allows the distilled feed solution to exit the shell side of membrane module 12, and reenter feed loop 14. Feed outlet line 24 is also connected to discharge line 31, which is a valve-controlled fluid conduit for purging a portion of the distilled feed solution.

Feed reservoir tank 26 is a container fed by feed conveyance line 20a, which provides a reservoir of the feed solution during operation. Feed reservoir tank 26 is also connected to feed conveyance line 20b for supplying the feed solution to fluid pump 28. Fluid pump 28 is a pump that interconnects feed conveyance lines 20b and 20c, and is configured to pressurize the feed solution within feed loop 14 to an elevated pressure at which the effective boiling temperature of the feed solution is greater than an elevated temperature that the feed solution is heated to in heat exchanger 30. This substantially prevents the feed solution from vaporizing in the feed loop piping due to the elevated temperature. As discussed below, the feed solution is desirably maintained in a liquid phase to prevent contaminants of the feed solution from mixing with the desired distillate fluid in distillate loop 16. This would otherwise reduce the purity of the distillate fluid, and could potentially require discarding the distillate fluid product.

The elevated pressure of the feed solution entering membrane module 12 is also desirably less than a liquid penetration pressure of the membranes of membrane module 12. As discussed below, the liquid penetration pressure is the pressure at which liquid from the feed solution penetrates through the pores of the membranes of membrane module 12 (i.e., from the shell side to the tube side), and is a function of several factors, such as the average pore radius of the membranes and the average liquid contact angle of the membranes (i.e., hydrophobicity of the membranes). Liquid penetration of the feed solution into the tube side of membrane module 12 may also result in the contamination of the distillate fluid, thereby reducing the purity of the distillate fluid. Examples of suitable elevated pressures for aqueous-based feed solutions with hollow fiber membranes having standard pore sizes (e.g., diameters of about 0.2 micrometers to about 0.8 micrometers) range from about 100 kilopascals (about 15 pounds/square inch (psi)) to about 310 kilopascals (about 45 psi), with particularly suitable elevated pressures ranging from about 140 kilopascals (about 20 psi) to about 280 kilopascals (about 45 psi), and with even more particularly suitable elevated pressures ranging from about 170 kilopascals (about 25 psi) to about 240 kilopascals (about 35 psi). While distillation system 10 is shown with a single fluid pump (i.e., fluid pump 28), distillation system 10 may alternatively include multiple fluid pumps to pressurize the feed solution to the elevated pressure.

Heat exchanger 30 is a heat-providing heat exchanger that interconnects feed conveyance line 20c and feed inlet line 22, thereby increasing the temperature of the feed solution passing from feed conveyance line 20c to feed inlet line 22. Accordingly, heat exchanger 30 heats the feed solution to an elevated temperature that is greater than the atmospheric-pressure boiling temperature of the feed solution. The term "atmospheric-pressure boiling temperature" refers to the boiling point temperature of the feed solution at 1 atmosphere of pressure (i.e., 100° C. for water at 1 atmosphere). Heating the feed solution allows the feed solution to enter membrane module 12 at the elevated temperature to increase the separation rate within membrane module 12.

The elevated temperature of the feed solution entering membrane module 12 is desirably less than a thermal degradation temperature of the membranes of membrane module 12 (not shown in FIG. 1). This reduces the risk of damaging membrane module 12 during operation. Examples of suitable elevated temperatures for aqueous-based feed solutions range from about 100° C. to about 130° C., with particularly suitable elevated temperatures ranging from about 110° C. to about 125° C., and with even more particularly suitable elevated temperatures ranging from about 115° C. to about 120° C. While distillation system 10 is shown with a single heat exchanger (i.e., heat exchanger 30), distillation system 10 may alternatively include multiple heat exchangers to heat the feed solution to the elevated temperature.

Distillate loop 16 is a fluid pathway for the distillate fluid, and includes heat exchanger 32, distillate conveyance lines 34a-34e, distillate reservoir tank 36, distillate recirculation pump 37, recovery line 38, pressure regulator 39, and storage tank 40. In addition to the distillate fluid obtained from the separation process within membrane module 12, distillate loop 16 also desirably contains a flow of cool distillate fluid to further assist the separation process. Heat exchanger 32 is a cooling heat exchanger that interconnects distillate conveyance lines 34a and 34b, thereby lowering the temperature of the distillate fluid flowing through distillate conveyance line 34a to distillate conveyance line 34b. Suitable lowered temperatures for the distillate fluid may vary depending on the composition of the distillate fluid. For aqueous distillate fluids, examples of suitable lowered temperatures range from about 25° C. to less than 55° C., with particularly suitable lowered temperatures ranging from about 30° C. to about 40° C.

Distillate conveyance lines 34a-34e are fluid conduits for distillate loop 16, and provide a clockwise flow path for the distillate fluid in the embodiment shown in FIG. 1. Distillate reservoir tank 36 is a container fed by distillate conveyance line 34b, which provides a reservoir of the cool distillate solution during operation. Distillate reservoir tank 36 is also connected to distillate conveyance line 34c for supplying the distillate fluid to distillate recirculation pump 37. Distillate recirculation pump 37 is a pump that interconnects distillate conveyance lines 34c and 34d, and is configured to circulate the distillate fluid within distillate loop 16. Distillate conveyance lines 34d and 34e respectively function as distillate inlet and outlet lines for membrane module 12. Accordingly, distillate recirculation pump 37 is connected to distillate conveyance line 34d for supplying the distillate fluid to membrane module 12, and distillate conveyance line 34e interconnects membrane module 12 and feed conveyance line 34a/recovery line 38, which allows the distillate fluid to exit membrane module 12, and reenter distillate loop 16.

Recovery line 38 is a valve-controlled fluid conduit connected to distillate conveyance line 34e for transferring a portion of the distillate fluid from distillate loop 16 to storage tank 40. Pressure regulator 39 monitors the flow through recovery line 38, thereby maintaining the pressure within distillate loop 16. This correspondingly balances the pressures across the membranes of membrane module 12. Storage tank 40 is a container for receiving the distillate fluid obtained from membrane modules 12. As discussed above, when distillation system 10 reaches a steady state operation, a portion of the feed solution is separated at membrane module 12 to provide the distillate fluid in distillate loop 16. As such, recovery line 38 and storage tank 40 allow the obtained amounts of distillate fluid to be removed from distillate loop 16 and stored as a recovered product (e.g., clean water from a brine solution). This allows distillate loop 16 to substantially maintain a steady state flow.

During a steady state operation, the feed solution flows in a counter-clockwise direction around feed loop 14, and is respectively heated and pressurized by heat exchanger 30 and fluid pump 28 to the elevated temperature and pressure. While flowing through feed loop 14, the feed solution flows into the shell side of membrane module 12 via feed inlet line 22. Also during the steady state operation, a supply of the distillate fluid flows in a clockwise direction around distillate loop 16, and is cooled by heat exchanger 32 to the lowered temperature. While flowing through distillate loop 16, the cooled distillate fluid flows into the tube side of membrane module 12 via distillate conveyance line 34d.

The cool distillate fluid and the heated/pressurized feed solution flowing into membrane module 12 create a temperature differential between the shell and tube sides of membrane module 12. For example, a feed solution entering membrane module 12 at about 120° C. and a distillate fluid entering membrane module 12 at about 30° C. provide a temperature differential of about 90° C. In comparison, a conventional membrane distillation system may have the aqueous brine feed solution entering a membrane module at temperature ranging from about 70° C. to about 90° C. and the water distillate fluid entering the membrane module at about 30° C., thereby providing a temperature differential ranging from about 40° C. to about 60° C. While this only provides a difference in temperature differentials of about 30° C., vapor pressure differentials across hollow fiber membranes are exponentially dependent on the temperature differentials between the shell and tube sides (e.g., the saturated vapor pressure of water almost doubles over this difference in temperatures). Accordingly, providing the feed solution to membrane module 12 at the elevated temperature substantially increases the vapor pressure differential between the shell and tube sides of membrane module 12. This correspondingly increases the separation rate of the distillate fluid from the feed solution, where the separated distillate fluid transfers from the shell side to the tube side of membrane module 12. The separated distillate fluid then exits membrane module 12, and is subsequently collected in recovery tank 40 as the desired distillate product (e.g., clean water in a water treatment process).

Figure 2:
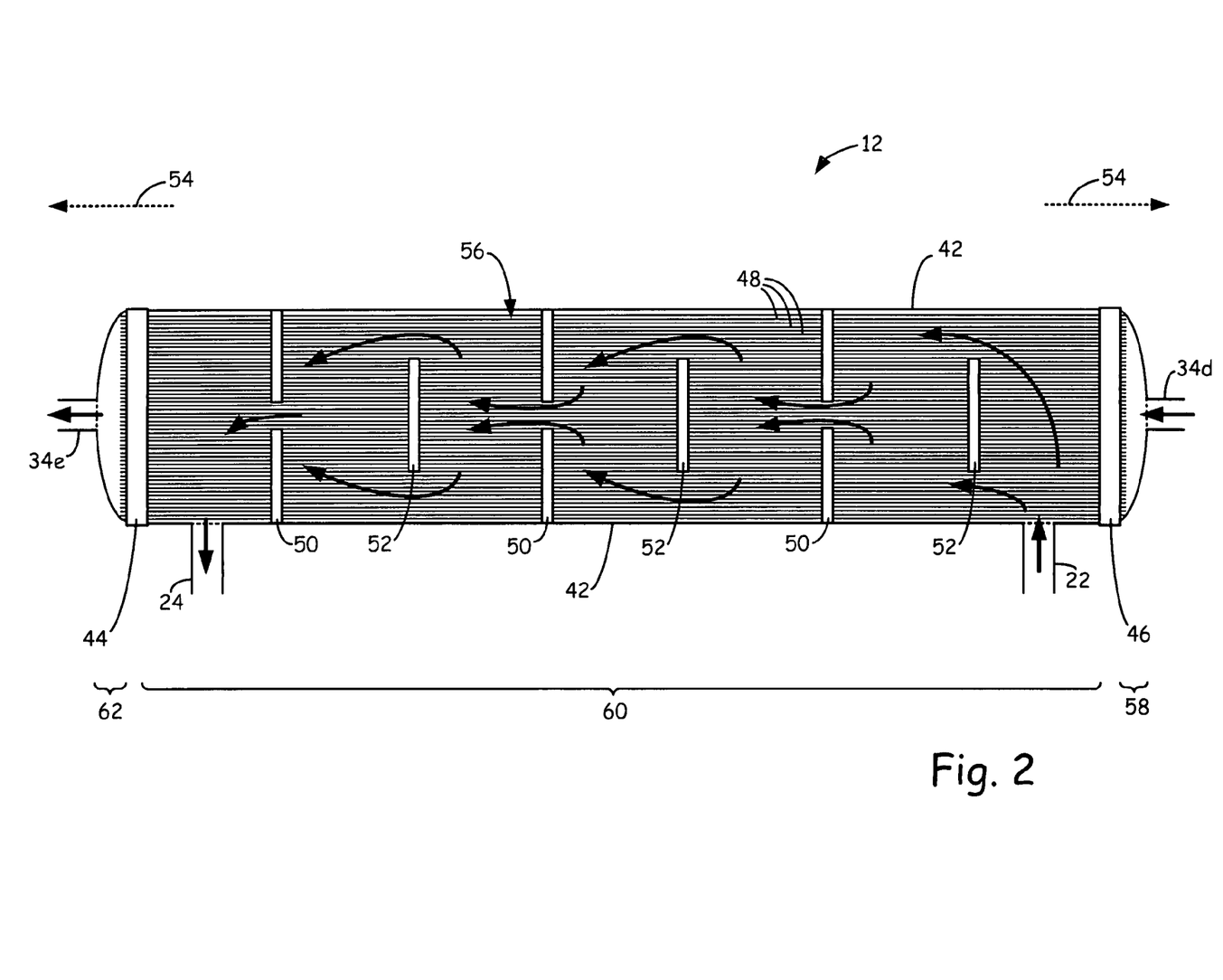
FIG. 2 is a schematic illustration of an interior of the hollow fiber membrane module.

FIG. 2 is a schematic illustration of an interior of membrane module 12, which includes outer casing 42, potting resin walls 44 and 46, hollow fiber membranes 48, and baffles 50 and 52. Outer casing 42 is a rigid structure extending along a longitudinal axis (referred to as longitudinal axis 54), and defines interior region 56 of membrane module 12. Outer casing 42 also desirably includes couplings (not shown) for connecting membrane module 12 to feed inlet line 22, feed outlet line 24, and distillate conveyance lines 34d and 34e.

Potting resin walls 44 and 46 are seals extending perpendicular to longitudinal axis 54, and are formed from one or more sealant materials, such as acrylate, urethane, and epoxy-based materials. Accordingly, potting resin walls 44 and 46 divide interior region 56 into distillate inlet chamber 58, contactor chamber 60, and distillate outlet chamber 62. Distillate inlet chamber 58 is the chamber disposed between outer casing 42 and potting resin wall 46, and is open to distillate conveyance line 34c. Contactor chamber 60 is the chamber disposed between potting resin walls 44 and 46, within outer casing 42, and is open to feed inlet line 22 and feed outlet line 24. As discussed below, contactor chamber 60 is the section of membrane module 12 where the distillate fluid separates from the feed solution. Distillate outlet chamber 62 is the chamber disposed between outer casing 42 and potting resin wall 44, and is open to distillate conveyance line 34d.

Hollow fiber membranes 48 are a plurality of tubular membranes that extend along longitudinal axis 54 between distillate inlet chamber 58 and distillate outlet chamber 62. Hollow fiber membranes 48 are formed from one or more hydrophobic, microporous materials that are capable of separating the distillate fluid from the feed solution via vapor pressure differentials. Hollow fiber membranes 48 are desirably bundled together within the volume of interior region 56 to increase the total membrane surface area. In one embodiment, hollow fiber membranes 48 substantially fill the open volume of contactor chamber 60. This allows the feed solution to travel through contactor chamber 60 in the interstitial voids between the membranes. Alternatively, one or more portions of contactor chamber 60 may be unoccupied by hollow fiber membranes 48, thereby providing larger flow paths for the feed solution.

Hollow fiber membranes 48 each include an inner hollow region (not shown in FIG. 2) that extends through potting resin walls 44 and 46, and baffles 50 and 52 along longitudinal axis 54. This provides a tube-side flow path for the distillate fluid between distillate inlet chamber 58 and distillate outlet chamber 62 (i.e., the distillate fluid may flow through the inner hollow regions of hollow fiber membranes 48). Conversely, the shell-side flow path of the feed solution extends between the exterior surfaces of hollow fiber membranes 48, within contactor chamber 60.

Baffles 50 and 52 are shell-side flow barriers (e.g., acrylate and epoxy-based barriers) within contactor chamber 60 that direct the flow of the feed solution in cross patterns relative to hollow fiber membranes 48. As shown, baffles 50 have axially-centric openings, thereby directing the flow paths of the feed solution toward the axial centers of contactor chamber 60. Baffles 52, however, have openings that are non-axially centric (e.g., adjacent outer casing 42), which directs the flow paths of the feed solution away from the axial centers of contactor chamber 60. Accordingly, the alternating arrangement of baffles 50 and 52 force the feed solution to flow across hollow fiber membranes 48, thereby increasing the mass and heat transfers across hollow fiber membranes 48. Suitable numbers of baffles 50 and 52 may vary depending on the dimensions of contactor chamber 60, and on the desired flow paths of the feed solution. Examples of suitable numbers of baffles (e.g., baffles 50 and 52) for contactor chamber 60 range from one baffle to fifteen baffles, with particularly suitable numbers of baffles ranging from one baffle to ten baffles.

During operation, the heated and pressurized feed solution enters contactor chamber 60 via feed inlet line 22. The feed solution is then directed around the openings of baffles 50 and 52, where baffles 50 and 52 cause the feed solution to move in a cross flow pattern relative to hollow fiber membranes 48. While the heated and pressurized feed solution flows through contactor chamber 60, the cool distillate fluid enters distillate inlet chamber 58 via distillate conveyance line 34c, and flows through the inner hollow regions of hollow fiber membranes 48 toward distillate outlet chamber 62. As the feed solution flows around the exterior surfaces of hollow fiber membranes 48, the temperature differentials between the exterior surfaces and the inner hollow regions of hollow fiber membranes 48 create vapor pressure differentials across hollow fiber membranes 48 within contactor chamber 60.

As discussed above, the elevated temperature of the feed solution substantially increases the vapor pressure differentials across hollow fiber membranes 48, thereby increasing the separation rate of the distillate fluid from the feed solution. The vapor pressure differentials cause a portion of the distillate fluid in the feed solution to evaporate and transmit through the micropores of hollow fiber membranes 48. When the vapor passes into the inner hollow regions of hollow fiber membranes 48, the cool supply of distillate fluid causes the vapor to condense within the inner hollow regions and mix with the supply of distillate fluid. The distillate fluid then flows toward distillate outlet chamber 62, and into distillate conveyance line 34d.

The elevated pressure of the feed solution allows the feed solution to retain a liquid state while flowing through the shell side of membrane module 12, adjacent the exterior surfaces of hollow fiber membranes 48. This reduces the risk of the feed solution vaporizing, and transmitting through the micropores of hollow fiber membranes 48 into the tube side of membrane module 12. Additionally, as discussed above, the elevated pressure of the feed solution entering membrane module 12 is also desirably-less than the liquid penetration pressure of hollow fiber membranes 48. If the pressure of the feed solution exceeds the liquid penetration pressure of hollow fiber membranes 48, portions of the liquid feed solution may be forced through the micropores of hollow fiber membranes 48 into the tube side of membrane module 12. Accordingly, the elevated temperature and pressure of the feed solution entering membrane module 12 are desirably balanced to increase the separation rate of the distillate fluid from the feed solution across hollow fiber membranes 48, while also preventing non-distillate fluid components of the feed solution from transmitting across hollow fiber membranes 48.

Figure 3:
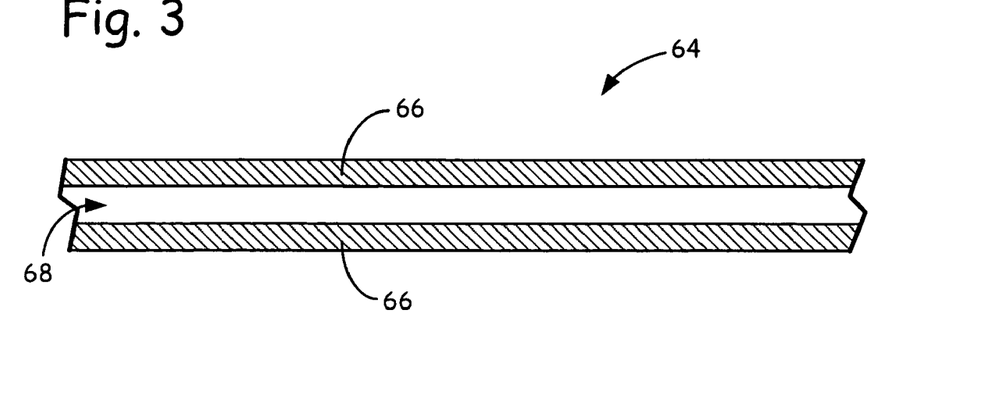
FIG. 3 is an expanded sectional view of an exemplary hollow fiber membrane in the hollow fiber membrane module.

FIG. 3 is an expanded sectional view of membrane 64, which is an example of a single membrane of hollow fiber membranes 48 (shown in FIG. 2). As shown in FIG. 3, membrane 64 includes membrane wall 66 and inner hollow region 68. Membrane wall 66 is formed from one or more hydrophobic materials and includes a plurality of micropores (not shown) that allow the transmission of gases and vapors, but restrict the flow of liquids and solids. This allows the evaporated distillate fluid to separate from the feed solution via vapor pressure differentials. Examples of suitable materials for membrane wall 66 include polymeric materials, such as polypropylenes, polyethylenes, polysulfones, polyethersulfones, polyetheretherketones, polyimides, polyphenylene sulfides, polytetrafluoroethylenes, polyvinylidene difluorides, and combinations thereof. Examples of particularly suitable materials for membrane wall 66 include thermally-resistant polymeric materials, such as polytetrafluoroethylenes, polyvinylidene difluorides, and combinations thereof.

As discussed above, while within contactor chamber 60, the cool distillate fluid flows through inner hollow region 68 of membrane 64 and the heated/pressurized feed solution flows adjacent to the exterior surface of membrane wall 66. This creates a vapor pressure differential across membrane wall 66, allowing distillate fluid vapor to evaporate and penetrate through the micropores of membrane wall 66 into inner hollow region 68. When the distillate fluid vapor passes into inner hollow region 68, the cool supply of distillate fluid causes the distillate fluid vapor to condense within inner hollow region 68 and mix with the supply of distillate fluid.

As further discussed above, the elevated pressure of the feed solution entering membrane module 12 is also desirably less than the liquid penetration pressure of membrane wall 66 of membrane 64. The liquid penetration pressure of membrane wall 66 is generally dependent on the composition of membrane wall 66, the wall thickness of membrane wall 66, and on the sizes of the micropores of membrane wall 66. Examples of suitable wall thicknesses for membrane wall 66 range from about 50 micrometers to about 200 micrometers, with particularly suitable wall thicknesses ranging from about 100 micrometers to about 150 micrometers. Examples of suitable average micropore sizes for membrane wall 66 range from about 0.1 micrometers to about 1.0 micrometers, with particularly average suitable micropore sizes ranging from about 0.3 micrometers to about 0.7 micrometers.

Figure 4:
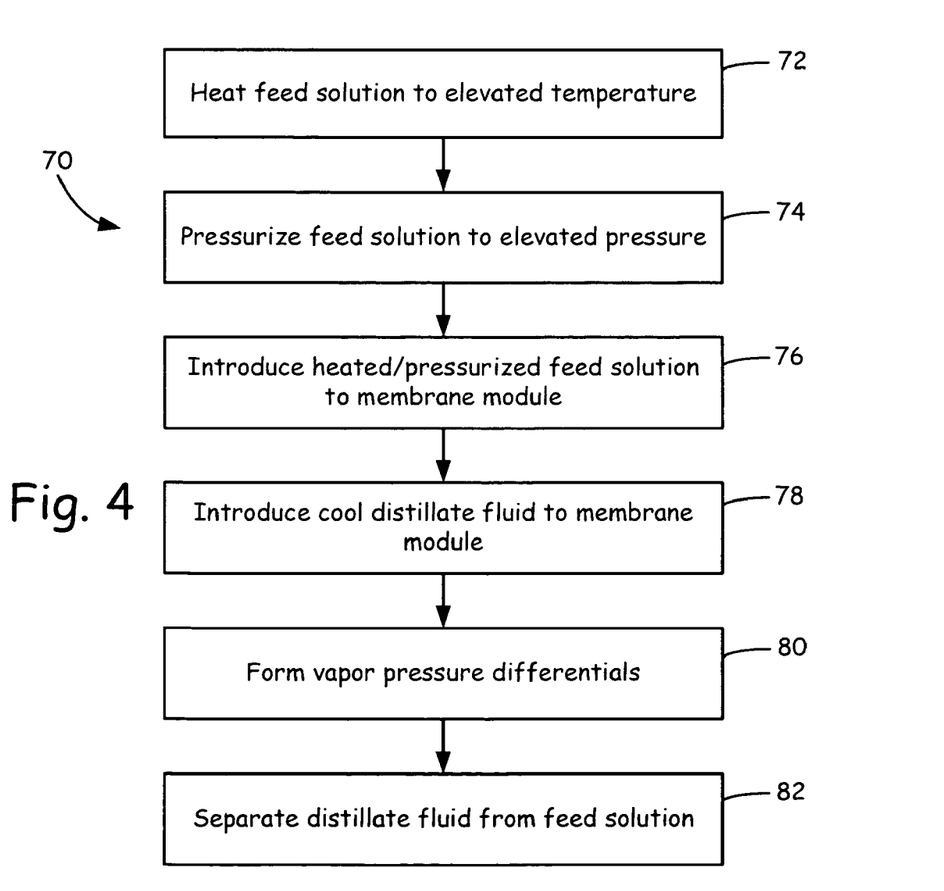
FIG. 4 is a flow diagram of a method for separating a distillate fluid from a feed solution.

FIG. 4 is a flow diagram of method 70 for separating a distillate fluid from a feed solution, which may be performed with distillation system 10 (shown in FIG. 1). As shown in FIG. 4, method 70 includes steps 72-82, and initially involves heating the feed solution to an elevated temperature that is greater than an atmospheric-pressure boiling temperature of the feed solution (step 72), and pressurizing the feed solution to an elevated pressure at which the effective boiling temperature of the feed solution is greater than the elevated temperature of the feed solution (step 74). Examples of suitable elevated temperatures and pressures for the feed solution include those discussed above for the feed solution used in feed loop 14 (shown in FIG. 1). The heating and pressurizing of the feed solution in steps 72 and 74 are desirably performed in a substantially simultaneous manner.

The heated and pressurized feed solution is then introduced to a shell side of a membrane module (step 76), where the membrane module includes a plurality of hollow fiber membranes (e.g., membrane module 12, shown in FIG. 2). Concurrent with the introduction of the heated and pressurized feed solution, cool distillate fluid is introduced to a tube side of the membrane module (step 78). As discussed above, the cool distillate fluid and the heated/pressurized feed solution create a temperature differential between the shell and tube sides of the membrane module (i.e., temperature differentials are created across the hollow fiber membranes of the membrane module). This forms vapor pressure differentials across the hollow fiber membranes (step 80), which are increased due to the elevated temperature of the feed solution. The vapor pressure differentials cause a portion of the distillate fluid in the feed solution to evaporate and transmit through the micropores of the hollow fiber membranes, thereby separating the distillate fluid from the feed solution (step 82). Accordingly, introducing the feed solution to the membrane module at the elevated temperature and pressure increases the production rate of the desired distillate fluid.

Figure 5:
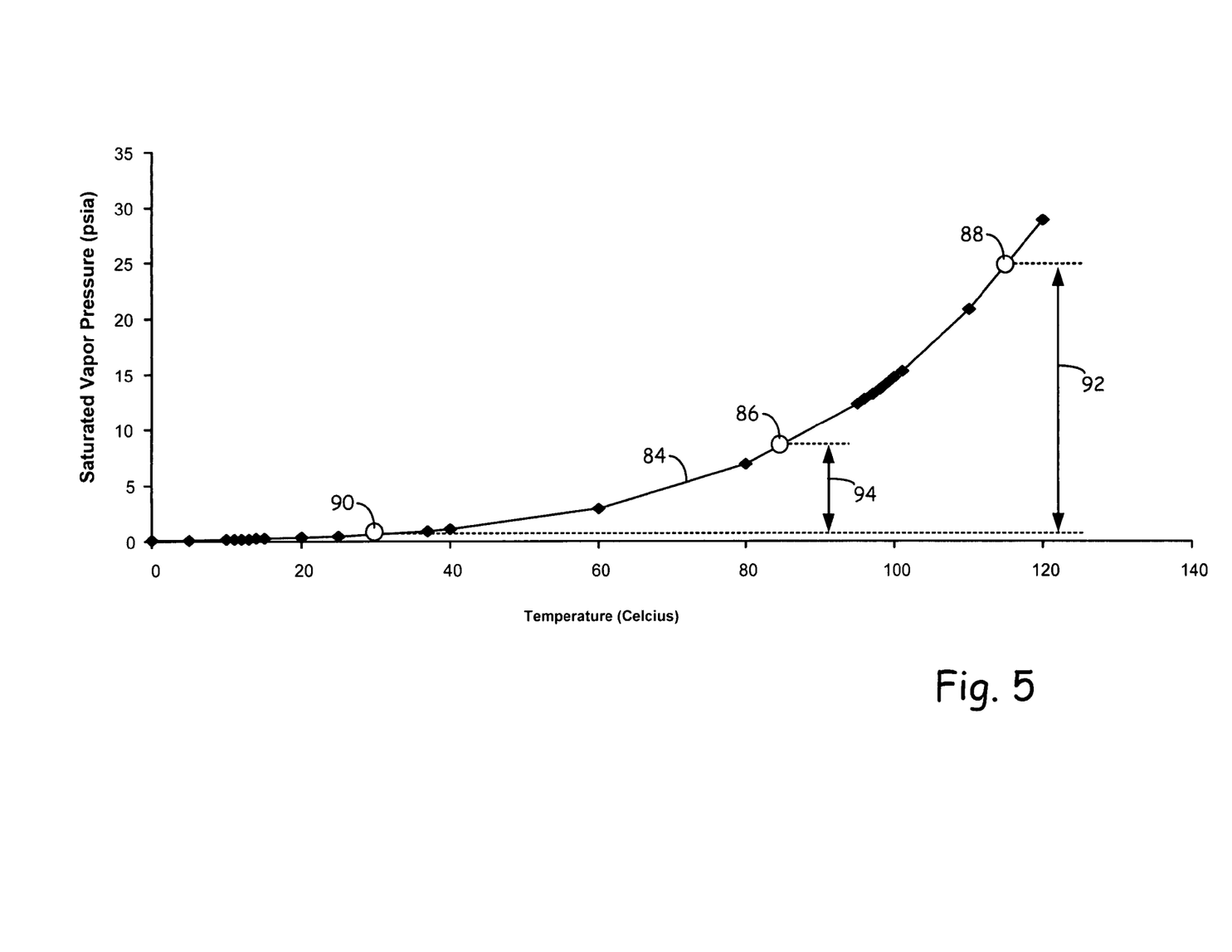
FIG. 5 is a graphical representation of saturated vapor pressures versus temperatures for feed solutions feed to membrane modules.

FIG. 5 is a graphical representation of saturated vapor pressures versus temperatures for aqueous brine feed solutions fed to membrane modules at different temperatures, where plot line 84 is a plot of the saturated vapor pressures for the feed solution at various temperatures. As shown, when a feed solution is heated to about 85° C., the feed solution has a saturated vapor pressure of about 9 psia (represented as coordinate point 86). In comparison, when the feed solution is heated to an elevated temperature of about 117° C. and pressurized to an elevated pressure to prevent the feed solution from boiling, the feed solution has a saturated vapor pressure of about 25 psia (represented as coordinate point 88). For distillate fluids maintained at about 30° C. (represented as coordinate point 90), the elevated temperature of the feed solution at coordinate point 88 provides a vapor pressure differential across the hollow fiber membranes (represented by arrowed line 92) that is substantially greater than the respective vapor pressure differential obtained with the feed solution at coordinate point 86 (represented by arrowed line 94). As discussed above, the increased vapor pressure differential correspondingly increases the production rate of the desired distillate fluid.

Although the present invention has been described with reference to preferred embodiments, workers skilled in the art will recognize that changes may be made in form and detail without departing from the spirit and scope of the invention.

The invention claimed is:

1. A method for producing a distillate fluid from a feed solution, the method comprising:

heating the feed solution to an elevated temperature that is greater than an atmospheric-pressure boiling temperature of the feed solution and less than about 130° C.;

pressurizing the feed solution to an elevated pressure from about 100 kilopascals to about 310 kilopascals to maintain the feed solution in a liquid phase by raising an effective boiling temperature of the feed solution to a temperature greater than the elevated temperature of the feed solution;

delivering heated and pressurized feed solution in the liquid phase to a feed side of a membrane module comprising a plurality of hollow fiber membranes to form a vapor pressure differential across the plurality of hollow fiber membranes;

separating distillate fluid from the heated and pressurized feed solution in the liquid phase by the formed vapor pressure differential by allowing vapor from the feed side of the membrane module to pass through the hollow fiber membranes and condense on a distillate side of the membrane module; and removing the condensed distillate fluid from the distillate side of the membrane module.

2. The method of claim 1, wherein the elevated temperature of the feed solution is in a range from about 100° C. to about 130° C.

3. The method of claim 2, wherein the range of the elevated temperature of the feed solution is from about 110° C. to about 125° C.

4. The method of claim 1, wherein the range of the elevated pressure of the feed solution is from about 140 kilopascals to about 280 kilopascals.

5. The method of claim 1, wherein the feed solution comprises an aqueous solution containing a solid or liquid that is fully dissolved, partially dissolved, dispersed, emulsified or suspended in the aqueous solution.

* * * * *

UNITED STATES PATENT AND TRADEMARK OFFICE
CERTIFICATE OF CORRECTION

| | | |
|---|---|---|
| PATENT NO. | : 7,871,520 B2 | Page 1 of 1 |
| APPLICATION NO. | : 12/002690 | |
| DATED | : January 18, 2011 | |
| INVENTOR(S) | : Zidu Ma et al. | |

It is certified that error appears in the above-identified patent and that said Letters Patent is hereby corrected as shown below:

Col. 10, Line 22

After "membrane module", Insert -- ; cooling at least a portion of the removed distillate fluid; and delivering cooled distillate fluid to the distillate side of the membrane module --

Signed and Sealed this
Seventh Day of June, 2011

David J. Kappos
*Director of the United States Patent and Trademark Office*